United States Patent
Zukawa (10) Patent No.: US 9,246,540 B2
(45) Date of Patent: Jan. 26, 2016

(54) RADIO BASE STATION AND MOBILE STATION

(75) Inventor: Hiroki Zukawa, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 338 days.

(21) Appl. No.: 13/145,354

(22) PCT Filed: Jan. 20, 2010

(86) PCT No.: PCT/JP2010/050614
§ 371 (c)(1),
(2), (4) Date: Oct. 6, 2011

(87) PCT Pub. No.: WO2010/084874
PCT Pub. Date: Jul. 29, 2010

(65) Prior Publication Data
US 2012/0039318 A1    Feb. 16, 2012

(30) Foreign Application Priority Data
Jan. 20, 2009   (JP) ................................. 2009-010300

(51) Int. Cl.
| H04W 4/00 | (2009.01) |
| H04B 1/7083 | (2011.01) |
| H04B 1/7115 | (2011.01) |
| H04B 7/02 | (2006.01) |
| H04W 48/16 | (2009.01) |

(52) U.S. Cl.
CPC ............ H04B 1/7083 (2013.01); H04B 1/7115 (2013.01); H04B 7/022 (2013.01); H04W 48/16 (2013.01)

(58) Field of Classification Search
CPC ................................................ H04W 36/0061
USPC ......................................................... 370/338
See application file for complete search history.

(56) References Cited

U.S. PATENT DOCUMENTS

| 6,545,996 B1 * | 4/2003 | Falco et al. ................... 370/347 |
| 2003/0092375 A1 | 5/2003 | Iwanaga et al. |
| 2004/0062298 A1 * | 4/2004 | McDonough .......... H04B 1/708 375/150 |
| 2004/0162075 A1 * | 8/2004 | Malladi et al. ................. 455/442 |

(Continued)

FOREIGN PATENT DOCUMENTS

| CN | 101110606 A | 1/2008 |
| EP | 1 675 273 A1 | 6/2006 |

(Continued)

OTHER PUBLICATIONS

International Search Report Issued Feb. 23, 2010 in PCT/JP10/050614 filed Jan. 20, 2010.

(Continued)

*Primary Examiner* — Shripal Khajuria
*Assistant Examiner* — Faisal Choudhury
(74) *Attorney, Agent, or Firm* — Oblon, McClelland, Maier & Neustadt, L.L.P.

(57) ABSTRACT

A radio base station BTS and a mobile station UE of the present invention includes a receiving unit 11 configured to receive a plurality of downlink signals from a plurality of cells through a plurality of paths, and a cell identification determination unit 12 configured to determine downlink signals with an identical scrambling code which are received during a predetermined period, as an identical downlink signals transmitted from one and the identical cell, from among the plurality of received downlink signals.

14 Claims, 10 Drawing Sheets (56) References Cited

U.S. PATENT DOCUMENTS

| | | | |
|---|---|---|---|
| 2006/0133458 A1* | 6/2006 | Ueno | H04B 1/70754 375/148 |
| 2006/0188005 A1* | 8/2006 | Espax | 375/148 |
| 2007/0025424 A1* | 2/2007 | Hahm | H04B 1/7115 375/144 |
| 2007/0153941 A1* | 7/2007 | Tiedemann et al. | 375/334 |
| 2007/0177535 A1* | 8/2007 | Zalio | 370/328 |
| 2007/0183484 A1* | 8/2007 | Brehler | G01S 19/235 375/148 |
| 2007/0189410 A1* | 8/2007 | Zeng | H04B 7/0894 375/267 |
| 2008/0248840 A1* | 10/2008 | Kim et al. | 455/574 |
| 2008/0274750 A1* | 11/2008 | Carlson | G01S 5/12 455/456.1 |
| 2008/0310525 A1* | 12/2008 | Lin et al. | 375/260 |
| 2009/0156225 A1* | 6/2009 | Angelow et al. | 455/450 |
| 2009/0175186 A1* | 7/2009 | Du et al. | 370/252 |
| 2009/0201876 A1* | 8/2009 | Morimoto | H04W 72/085 370/330 |
| 2010/0039972 A1* | 2/2010 | Wang et al. | 370/311 |
| 2010/0056170 A1* | 3/2010 | Lindoff | H04L 1/0026 455/452.1 |
| 2010/0329150 A1* | 12/2010 | Nielsen | 370/254 |
| 2011/0039536 A1* | 2/2011 | Lee et al. | 455/422.1 |

FOREIGN PATENT DOCUMENTS

| | | |
|---|---|---|
| JP | 2003 153324 | 5/2003 |
| JP | 2006 180146 | 7/2006 |
| JP | 2006 237983 | 9/2006 |
| JP | 2008 271398 | 11/2008 |
| WO | WO 2008/135851 A1 | 11/2008 |

OTHER PUBLICATIONS

Chinese Office Action dated Nov. 4, 2013, issued in counterpart Chinese Patent Application with an English translation.

Extended European Search Report issued Oct. 9, 2014, in European Patent Application No. 10733481.5.

* cited by examiner

RADIO BASE STATION AND MOBILE STATION

TECHNICAL FIELD

The present invention relates to a radio base station and a mobile station.

BACKGROUND ART

Conventionally, in a mobile communication system in a WCDMA mode, a mobile station UE is configured to select a cell transmitting a downlink signal with the best quality as a serving cell through cell search procedure. The mobile station UE is configured to select only a cell transmitting a downlink signal with the best quality by the cell search.

Hereinafter, referring to FIGS. 7 and 8, description is briefly given of the cell search procedure and neighboring cell information acquisition procedure.

Figure 7:
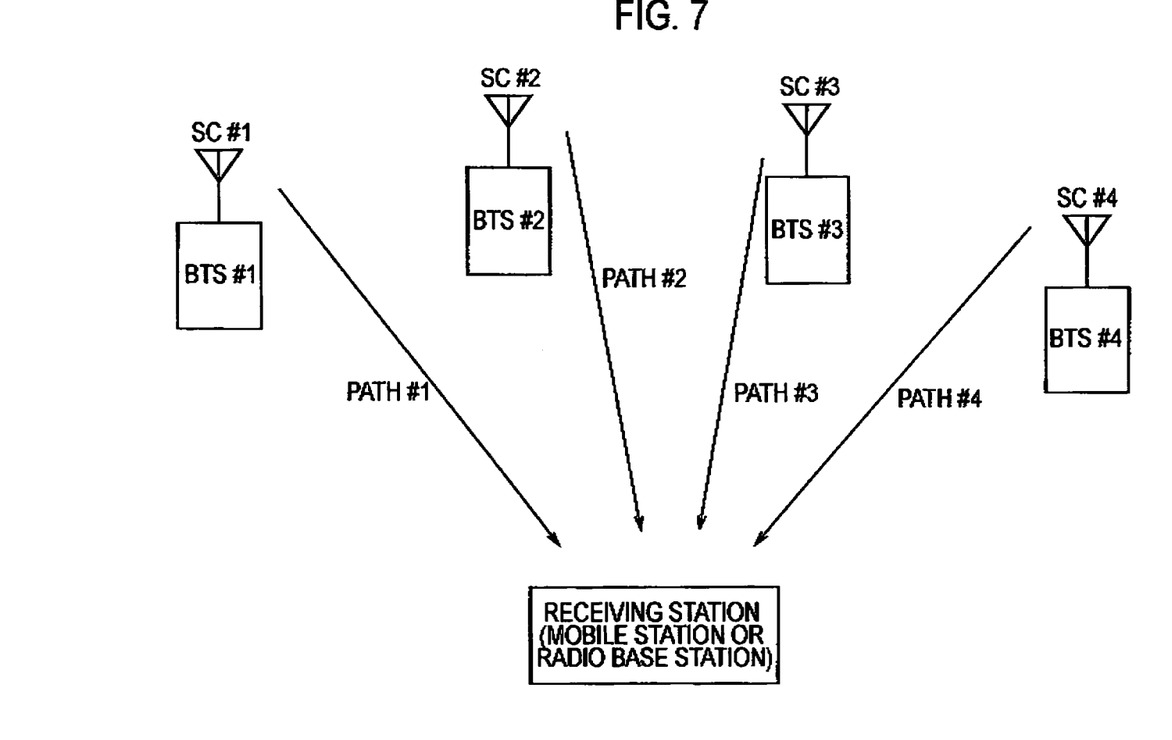
FIG. 7 is a drawing for illustrating a conventional mobile communication system.
Figure 8:
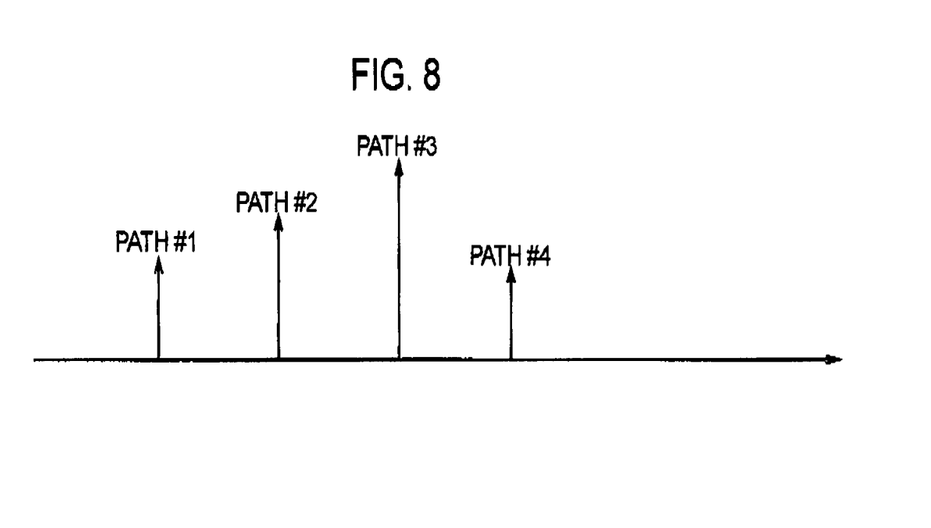
FIG. 8 is a drawing for illustrating a conventional mobile communication system.

In FIG. 7, a receiving station receives downlink signals transmitted in cells #1 to #4 in radio base stations BTS #1 to #4 existing around the receiving cell. FIG. 8 shows an example of the receiving states of the downlink signals through the respective paths in the receiving station in this case.

Here, if the receiving station in FIG. 7 is a mobile station UE, the receiving station selects the downlink signal #3 with the best quality received via the path #3 through the cell search procedure.

However, if the receiving station performs cell search on multiple paths and acquires information on multiple neighboring cells, the receiving station can perform more advanced processing than the above.

For example, a radio base station BTS sets operational parameters in a "Plug & Play" mode, and therefore can set parameters based on a result of the cell search. Accordingly, if the receiving station shown in FIG. 7 is a radio base station BTS, the receiving station can perform more advanced processing by performing cell search on all the cells which establish the paths #1 to #4, and acquiring cell information on the cells which establish the respective paths #1 to #4.

Figure 9:
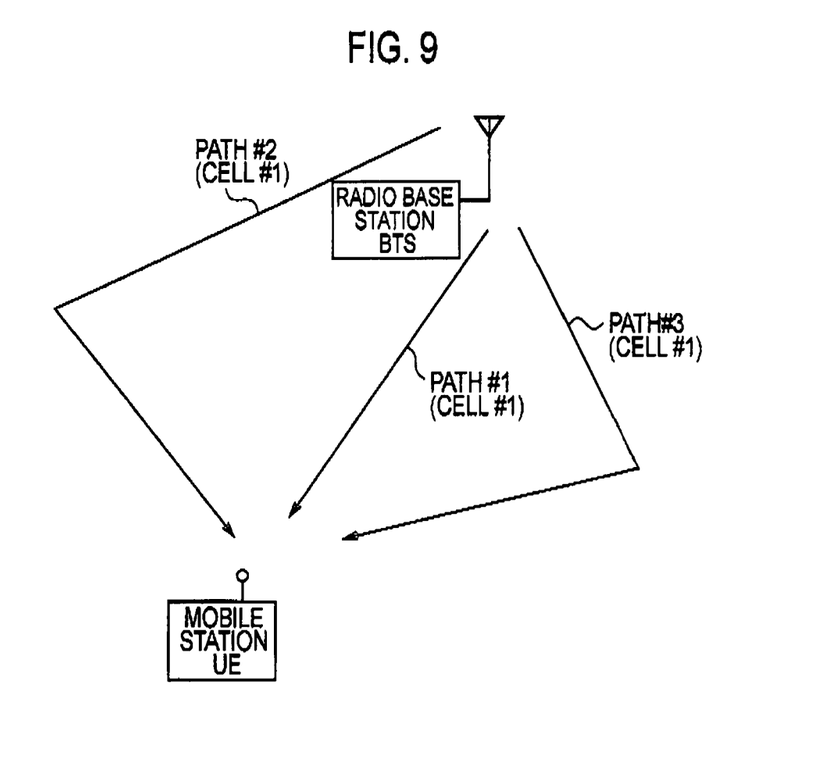
FIG. 9 is a drawing for illustrating a conventional mobile communication system.
Figure 10:
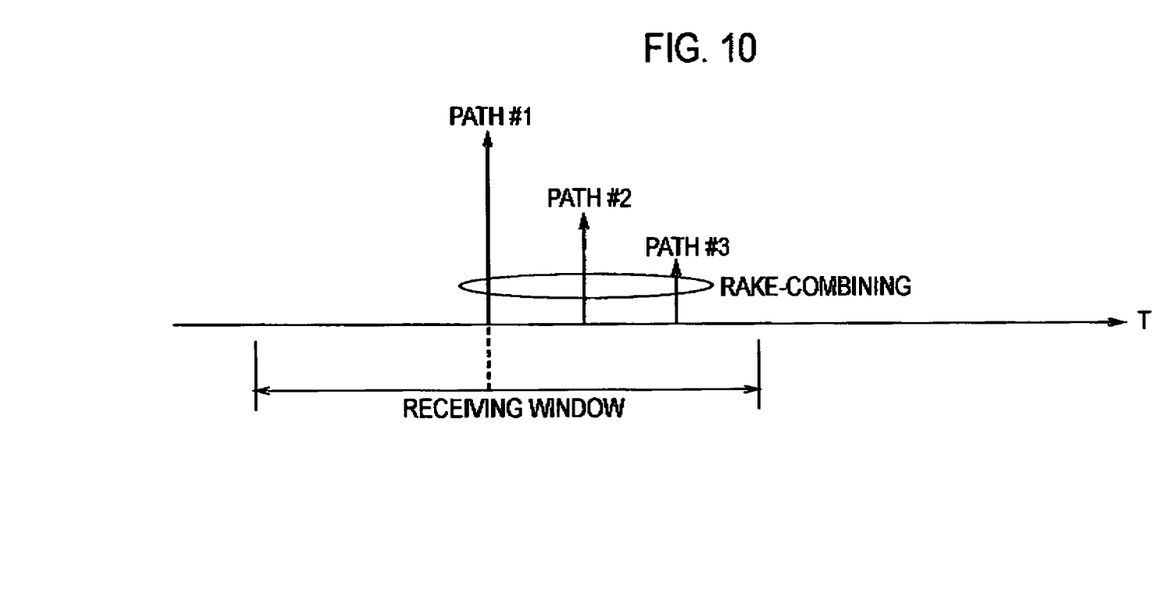
FIG. 10 is a drawing for illustrating a conventional mobile communication system.

In addition, handling of a multi-path is briefly described below referring to FIGS. 9 and 10.

In general, a mobile station UE receives a downlink signal through multiple paths from a radio base station BTS. In FIG. 9, if the paths #1 to #3 are present, the receiving states of downlink signals in a mobile station UE are shown in FIG. 10.

For the normal cell search processing to find a single cell, a radio base station BTS is configured to select only a cell which establishes a path #1 through which a downlink signal with the best quality is transmitted.

Meanwhile, when synchronization between the cell is completed, the mobile station UE can improve a communication quality by performing RAKE-combining on the downlink signals #1 to #3 with the same scrambling code which have an arrival time difference therebetween within a receiving window.

In general, such a mobile communication system employs a system design in which a same scrambling code is not assigned to neighboring cells. Further, in a case where some downlink signals are received from another cell using the same scrambling code, if the downlink signals have arrival time differences out of the receiving window, the downlink signals are not included in the RAKE-combining, and thus the downlink signals from the other cells are not combined.

PRIOR ART DOCUMENT

Patent Document

Patent Document 1 JP-A 2006-237983

SUMMARY OF THE INVENTION

Problems to be Solved by the Invention

The system is generally designed not to assign an identical scrambling code to neighboring cells, as described above. However, there is a case where the system is configured to allow multiple cells geographically apart from each other to transmit downlink signals using the identical scrambling code.

Even in these circumstances, if a receiving station performs normal communications, no fatal problem occurs as far as arrival time differences are out of the receiving window, as described above. However, there is a problem that the receiving station needs to determine whether the senders of the respective downlink signals are an identical cell or different cells in the process of acquiring information on multiple neighboring cells.

Hereinafter, the above-described problem is briefly described referring to FIGS. 11 through 13.

Figure 11:
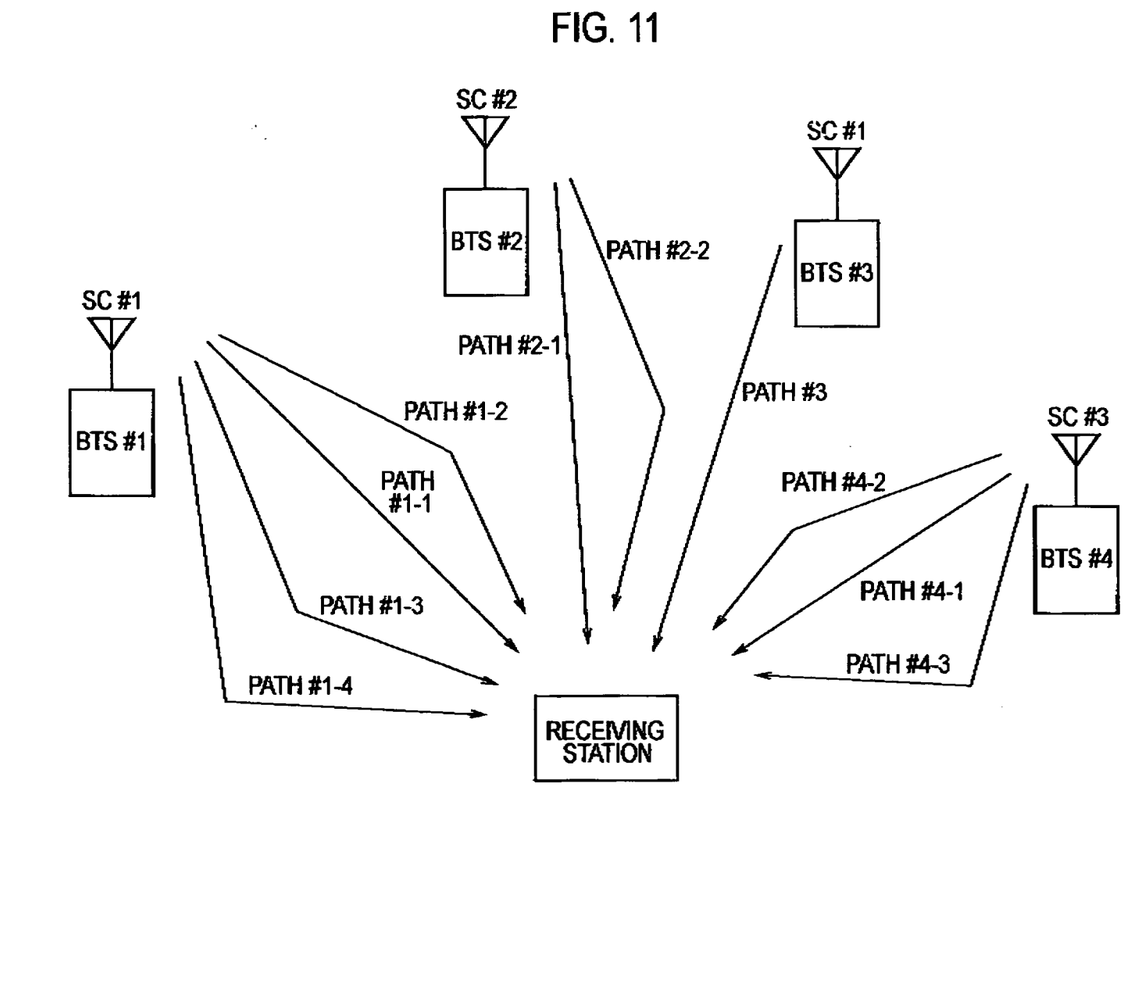
FIG. 11 is a drawing for illustrating a conventional mobile communication system.

In FIG. 11, a receiving station receives downlink signals transmitted from cells #1 to #4 in radio base stations BTS #1 to #4 existing around the receiving station. FIG. 12 shows the receiving states of downlink signals via the respective paths in the receiving station in the above-described case.

Figure 12:
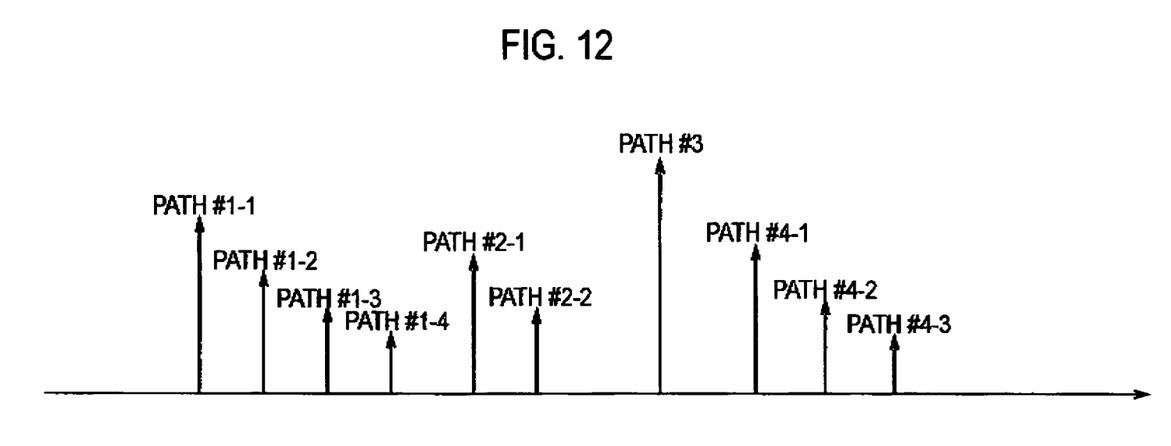
FIG. 12 is a drawing for illustrating a conventional mobile communication system.

In this case, the receiving station needs to acquire cell information contained in the downlink signals received through the paths shown in FIG. 12 after separating the downlink signals by each of scrambling codes SC #1 to SC #3.

Figure 13:
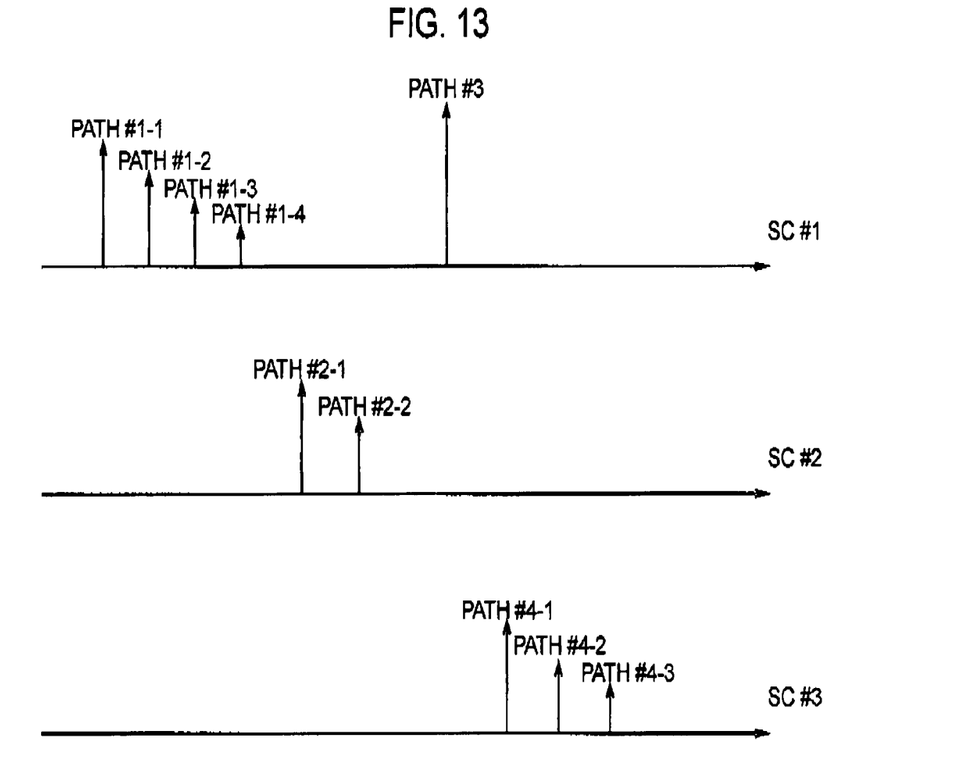
FIG. 13 is a drawing for illustrating a conventional mobile communication system.

In FIG. 13, as for the scrambling code SC #2, the receiving station may acquire the cell information based on the RAKE-combined signal of the downlink signals received though the paths #2-1 and #2-2 or may acquire cell information based only on the downlink signal with the best quality, which is received through the path #2-1.

Similarly, as for the scrambling code SC #3, the receiving station may acquire cell information based on the RAKE-combined signal of the downlink signals received though the paths #3-1 to #3-3 or may acquire cell information based only on the downlink signal with the best quality, which is received through the path #3-1.

On the other hand, as for the scrambling code SC #1, if the receiving station RAKE-combines the downlink signals received through the paths #1-1 to #1-4 and the path #3, the downlink signals from different cells are combined together, which causes the problem.

In addition, if the receiving station acquires cell information using only the downlink signal with the best quality which is received through the path #3, the receiving station cannot acquire the cell information on the cell #1.

To avoid the above problems, the receiving station acquires the cell information from all downlink signals received through the paths #1-1 to #1-4, and the path #3. In this case, the receiving station will acquire the cell information on the cell #1 three times, though once should be enough in fact. Thus, there is a concern that processing time is unnecessarily increased.

In other words, when the downlink signals having the identical scrambling code are transmitted through multiple paths, the receiving station to acquire neighboring cell information has a problem of being incapable of efficiently determining if the downlink signals are transmitted from different cells or from a single cell.

The present invention has been made with a view to the aforementioned problems. Accordingly, an objective of the present invention is to provide a radio base station and a mobile station that are capable of efficiently distinguishing whether downlink signals are different downlink signals transmitted from different cells or an identical downlink signal transmitted from an identical cell.

Means for Solving the Problems

The first feature of the present invention is summarized in that a radio base station including a receiving unit configured to receive a plurality of downlink signals from a plurality of cells through a plurality of paths, and a cell identification determination unit configured to determine downlink signals with an identical scrambling code which are received during a predetermined period, as a single downlink signal transmitted from the identical cell, from among the plurality of received downlink signals.

The second feature of the present invention is summarized in that a mobile station including a receiving unit configured to receive a plurality of downlink signals from a plurality of cells through a plurality of paths, and a cell identification determination unit configured to determine downlink signals with an identical scrambling code which are received during a predetermined period, as a single downlink signal transmitted from the identical cell, from among the plurality of received downlink signals.

Effects of the Invention

As described above, the present invention provides a radio base station and a mobile station that are capable of efficiently distinguishing whether downlink signals are different downlink signals transmitted from different cells or an identical downlink signal transmitted from an identical cell.

MODES FOR CARRYING OUT THE INVENTION (Configuration of Mobile Communication System According to First Embodiment of the Invention)

Referring to FIGS. 1 through 5, the configuration of a mobile communication system according to a first embodiment of the present invention is described.

Figure 1:
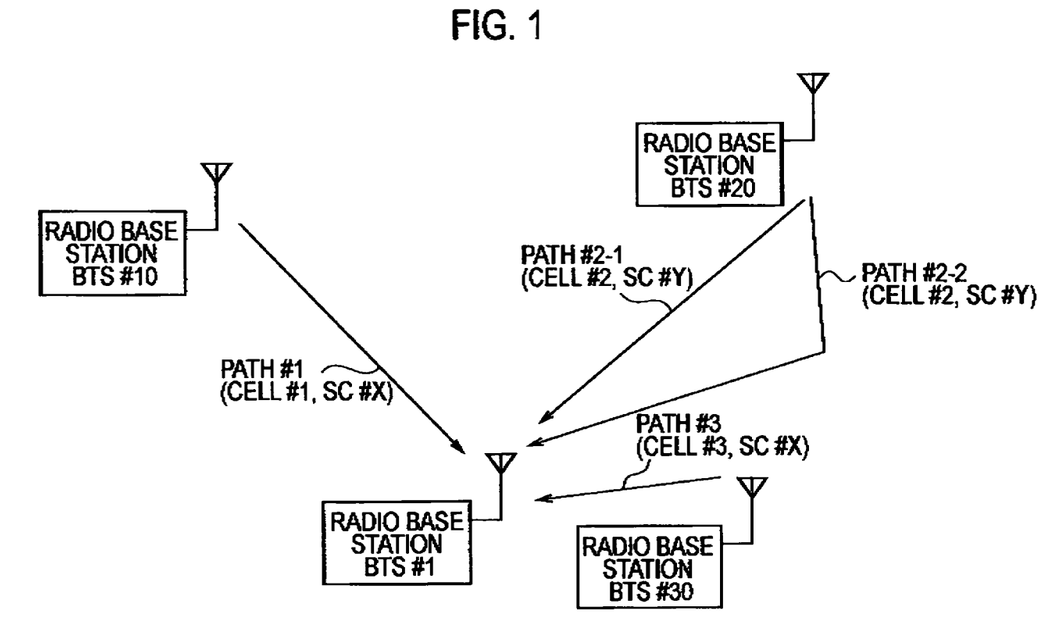
FIG. 1 is an overall configuration diagram of a mobile communication system according to a first embodiment of the invention.

As shown in FIG. 1, disposed in the mobile communication system according to the present embodiment are a radio base station BTS #1, a radio base station BTS #10, a radio base station BTS #20, and a radio base station BTS #30.

In the example of FIG. 1, the radio base station BTS #10 manages a cell #1, the radio base station BTS #20 manages a cell #2, and the radio base station BTS #30 manages a cell #3.

The radio base station BTS #1, the radio base station BTS #10, the radio base station BTS #20, and the radio base station BTS #30 may be respectively macrocell radio base stations which are managed by a mobile carrier or the like or may be femto cell radio base stations which are managed by subscribers of mobile communication services provided by a mobile carrier.

Note that the mobile communication system according to the present embodiment may be a WCDMA mode mobile communication system, an LTE (Long Term Evolution) mode mobile communication system, or other modes of mobile communication systems.

Figure 2:
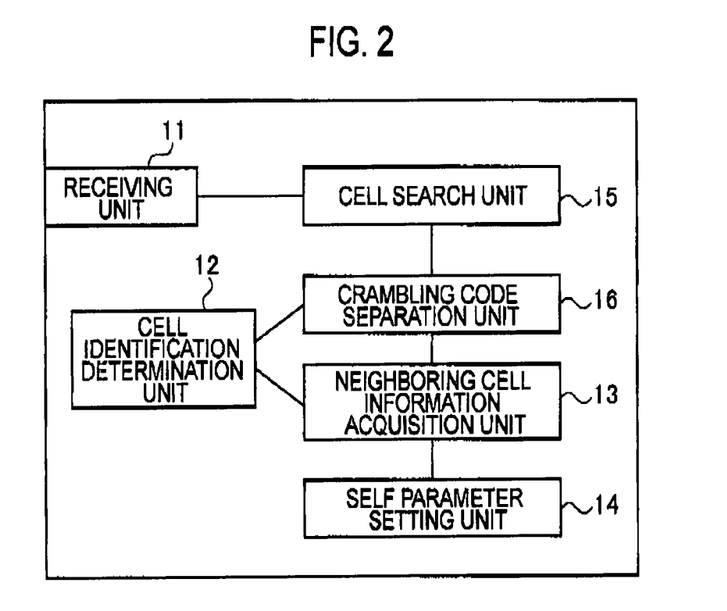
FIG. 2 is a functional block diagram of a radio base station and a mobile station according to the first embodiment of the invention.

As shown in FIG. 2, the radio base station BTS #1 includes a receiving unit 11, a cell identification determination unit 12, a neighboring cell information acquisition unit 13, a self parameter setting unit 14, a cell search unit 15, and a scrambling code separation unit 16.

Note that the radio base station BTS #10, the radio base station BTS #20, and the radio base station BTS #30 may include the configuration similar to that of the radio base station BTS #1 or may include the configuration different from that of the radio base station BTS #1.

The receiving unit 11 is configured to receive downlink signals through multiple paths #1, #2-1, #2-2, and #3 from the multiple cells #1, #2, and #3.

Here, a scrambling code SC #X is used in the cell #1 and the cell #3, while a scrambling code SC #Y is used in the cell #2. Accordingly, the scrambling code for the downlink signals of the path #1 and path #3 is SC #X and the scrambling code for the downlink signals of the path #2-1 and path #2-2 is SC #Y.

The cell search unit 15 identifies a receive timing and a scrambling code of a downlink signal of each path by performing cell search on the multiple downlink signals received by the receiving unit 11.

Figure 3:
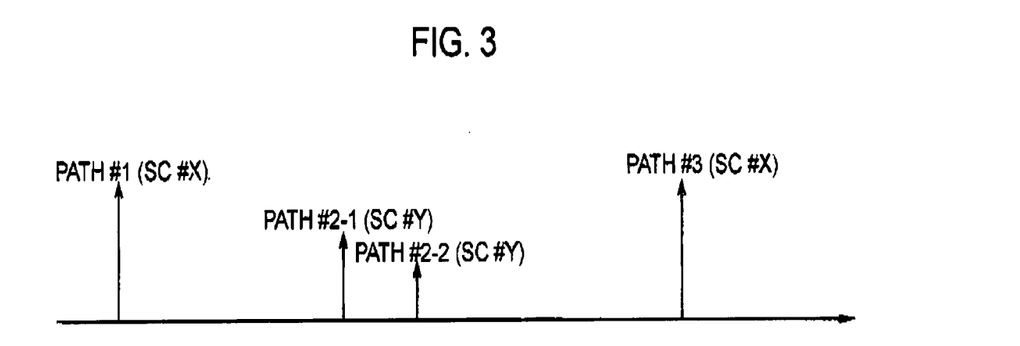
FIG. 3 is a drawing for illustrating a path detection method performed by the radio base station and the mobile station according to the first embodiment of the invention.

Specifically, as shown in FIG. 3, the cell search unit 15 identifies the receive timing and the scrambling code of the downlink signal of each path.

The scrambling code separation unit 16 separates the downlink signals of all the paths, which are detected by the cell search unit 15, by each of scrambling codes.

Figure 4:
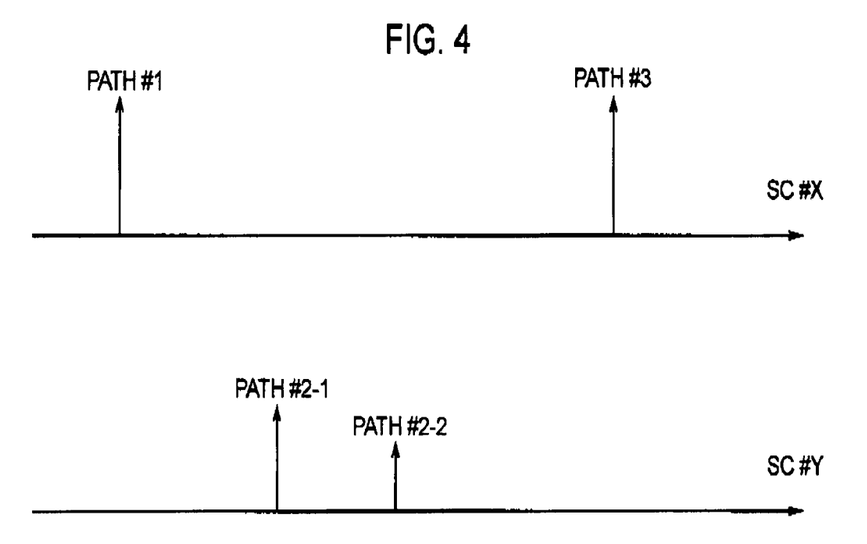
FIG. 4 is a drawing for illustrating a path detection method performed by the radio base station and the mobile station according to the first embodiment of the invention.

Specifically, as shown in FIG. 4, the scrambling code separation unit 16 separates the downlink signals of the paths detected by the cell search unit 15 by the scrambling codes SC #X and SC #Y.

The cell identification determination unit 12 is configured to distinguish whether downlink signals are different downlink signals transmitted from the different cells or an identical downlink signal transmitted from an identical cell, from among the multiple downlink signals separated by the scrambling code separation unit 16.

Figure 5:
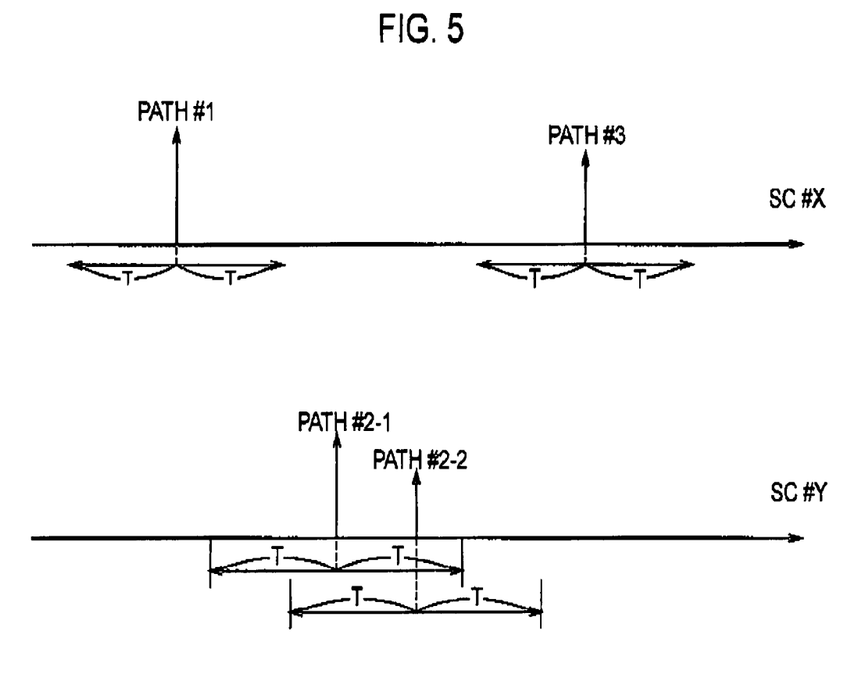
FIG. 5 is a drawing for illustrating a path detection method performed by the radio base station and the mobile station according to the first embodiment of the invention.

Specifically, for the scrambling code SC #X, the cell identification determination unit 12 determines that the downlink signals of the path #1 and path #3 are downlink signals from different cells because the arrival time difference between the downlink signals of the path #1 and #3 is larger than a predetermined value (±T), as shown in FIG. 5.

In addition, for the scrambling code SC #Y, the cell identification determination unit 12 determines the downlink signals of the paths #2-1 and #2-2 as a series of signals transmitted from the identical cell because the arrival time difference between the downlink signals of the paths #2-1 and #2-2 is equal to or smaller than the predetermined value (±T).

Note that the above-described predetermined value (±T) may be a setting parameter in the radio base station BTS or may be notified from a network device.

The neighboring cell information acquisition unit 13 is configured to acquire all pieces of the cell information respectively contained in the multiple downlink signals #1 and #3, which are determined by the cell identification determination unit 12 as different downlink signals transmitted from the different cells, and to acquire one piece of cell information from the multiple downlink signals #2-1 and #2-2, which are determined by the cell identification determination unit 12 as the identical downlink signal transmitted from the identical cell.

Here, the neighboring cell information acquisition unit 13 may acquire the cell information after the RAKE combining of the downlink signals #2-1 and #2-2 is performed or may acquire the cell information only by using the downlink signal #2-1 which is a high-quality signal.

The self parameter setting unit 14 is configured to automatically set an operational parameter based on the cell information acquired by the neighboring cell information acquisition unit 13.

Here, a scrambling code, a frequency, or transmission power used in a cell in the radio base station BTS #1 is an operational parameter.

(Operation of Mobile Communication System according to First Embodiment of the Invention)

Figure 6:
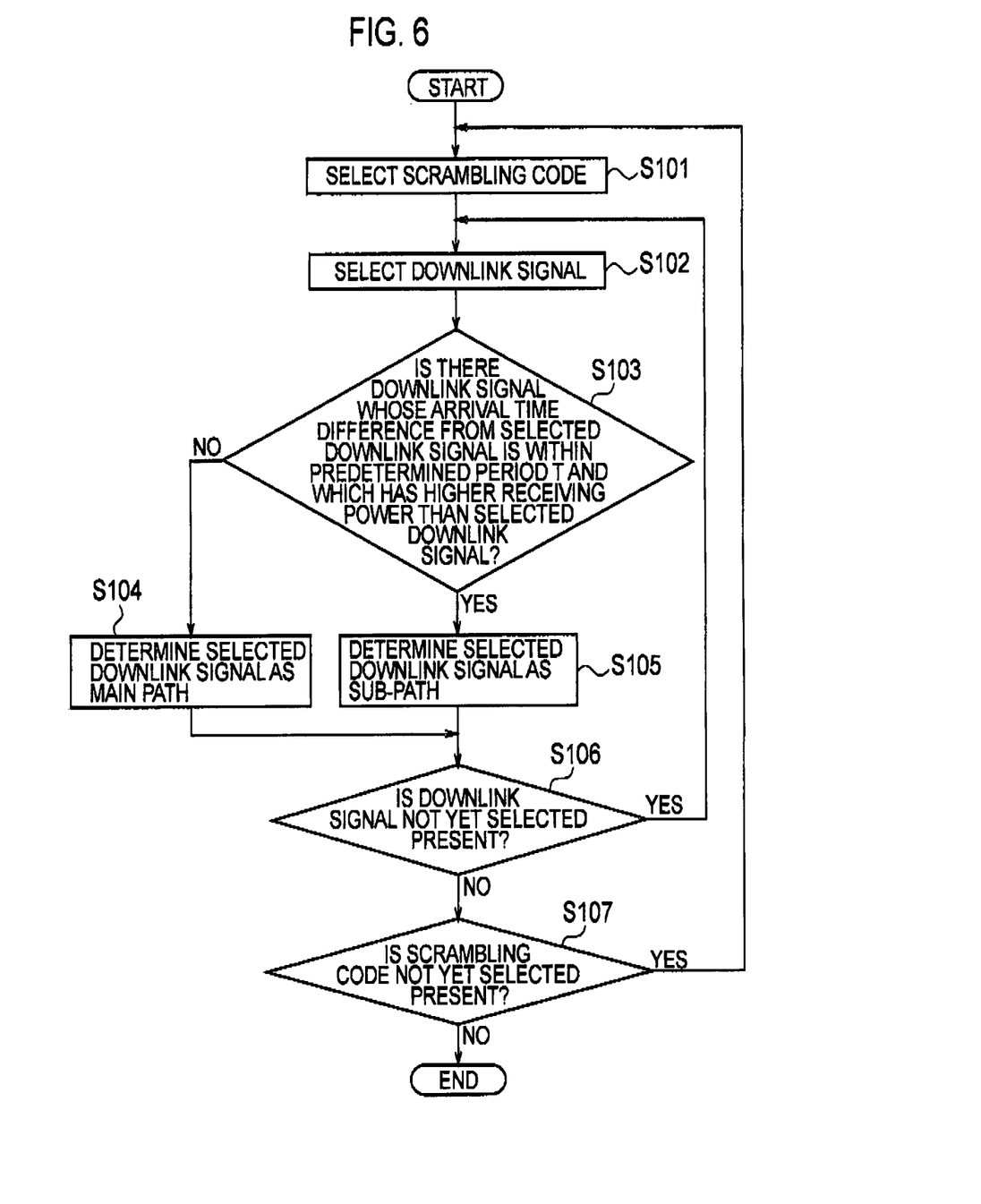
FIG. 6 is a flowchart illustrating operations of the radio base station and the mobile station according to the first embodiment of the invention.

Referring to FIG. 6, the description is given of an operation in which, in the mobile communication system according to the first embodiment of the present invention, the cell identification determination unit 12 of the radio base station BTS #1 selects a downlink signal to be a receiving target of cell information, among the received multiple downlink signals, by distinguishing whether the received plurality downlink signals are the different downlink signals transmitted from the different cells or an identical downlink signal transmitted from the identical cell.

As shown in FIG. 6, at step S101, the cell identification determination unit 12 selects one scrambling code not yet selected, from among all the scrambling codes separated by the scrambling code separation unit 16.

At step S102, the cell identification determination unit 12 selects one downlink signal not yet selected among the multiple downlink signals received though the path in which the scrambling code selected at step S101 is used.

At step S103, the determination unit 12 determines if there is a downlink signal whose arrival time difference from the downlink signal selected at step S102 is equal to or smaller than a predetermined value (±T) and whose receiving power is higher than that of the downlink signal.

If it is determined that the downlink signal is present, the cell identification determination unit 12 proceeds to step S105, and if it is determined that the downlink signal is absent, it proceeds to step S104.

At step S104, the cell identification determination unit 12 determines the downlink signal selected at step S102 as a downlink signal of a main path. On the other hand, at step S105, the cell identification determination unit 12 determines the downlink signal selected at step S102 as a downlink signal of a sub-path.

In the example of FIG. 5, the cell identification determination unit 12 selects the path #1 or the path #3 at step S102 if the scrambling code SC #X is selected at step S101. Even if any of the path #1 and the path #3 is selected, there is no downlink signal whose arrival time difference from the downlink signal of the path #1 or the path #3 is equal to or smaller than the predetermined value (±T). Accordingly, the present operation proceeds to step S104 and the path #1 or the path #3 is determined as a main path.

In addition, in the example of FIG. 5, if the cell identification determination unit 12 selects the scrambling code SC #Y at step S101, and selects the path #2-1 at step S102, there is a downlink signal of the path #2-1 whose arrival time difference from the downlink signal of the path #2-1 is equal to or smaller than a predetermined value (±T). The receiving power of the downlink signal of the path #2-2, however, is lower than the receiving power of the downlink signal of the path #2-1. Accordingly, the present operation also proceeds to step S104 to determine the path #2-1 as a main path.

On the other hand, if the cell identification determination unit 12 selects the path #2-2 at S102, there is a downlink signal of the path #2-1 whose arrival time difference from the downlink signal of the path #2-2 is equal to or smaller than a predetermined value (±T) and the receiving power of the downlink signal of the path #2-1 is higher than the receiving power of the downlink signal of the path #2-2. Accordingly, the present operation proceeds to step S105 to determine the path #2-1 as a sub-path.

At step S106, the cell identification determination unit 12 determines if a downlink signal not yet selected at step S102 is present, among the downlink signals having the scrambling codes selected at step S101.

If it is determined that the downlink signal is present, the cell identification determination unit 12 returns to step S102, and if it is determined that the downlink signal is absent, it proceeds to step S107.

At step S107, the cell identification determination unit 12 determines if there is a scrambling code not yet selected at step S101.

If it is determined that the scrambling code is present, the cell identification determination unit 12 returns to step S101, and if it is determined that the scrambling code is absent, it terminates the present operation.

Note that the neighboring cell information may be acquired only from a path determined as a main path by the aforementioned procedures, or may be acquired after the path determined as a main path and the path determined as a sub-path are RAKE-combined.

(Advantageous Effects of Mobile Communication System According to First Embodiment of the Invention)

Among the multiple received downlink signals #1, #2-1, #2-2, and #3, the mobile communication system according to the first embodiment of the present invention determines the downlink signals #2-1 and #2-2 which use the identical scrambling code SC #Y and whose arrival time difference is equal to or smaller than a predetermined value (±T) as the single downlink signal transmitted from the identical cell #2, and determines the signals #1 and #3 which use the identical scrambling code SC #X and whose arrival time difference is larger than the predetermined value (±T) as different cells, so that different series of downlink signals transmitted from different cells can be distinguished from the single series downlink signals transmitted from the same cell.

In addition, the radio base station BTS #1 which is used in the mobile communication system according to the first embodiment of the present invention can reduce the downlink signals to be targets of decoding processing (for example, a target to receive cell information) when cell information on a neighboring cell is acquired and can shorten the processing time and can shorten a time for communication service interruption in the radio base station BTS #1.

Furthermore, the radio base station BTS #1 which is used in the mobile communication system according to the first embodiment can avoid a situation that in a case where the identical scrambling code is used for multiple downlink signals to be targets of decoding processing (a target to receive cell information) in a normal situation when cell information on a neighboring cell is acquired, only one of the downlink signals becomes a target (for example, a target to receive cell information).

The characteristics of the aforementioned embodiment may be expressed as follows.

The first characteristic of the present embodiment is a radio base station BTS #1 which includes a receiving unit 11 configured to receive downlink signals of multiple paths #1, #2-1, #2-2, and #3 from multiple cells #1, 42, and #3, and a cell identification determination unit 12 configured to determine the downlink signals #2-1 and #2-2 which use the identical scrambling code SC #Y and whose arrival time difference is equal to or smaller than a predetermined value (±T) as the single series of downlink signals transmitted from the identical cell #2, and determine the downlink signals #1 and #3 which use the same scrambling code #X and whose arrival time difference is larger than a predetermined value (±T) as the different series of downlink signals from different cells, from among the multiple received downlink signals #1, #2-1, 42-2, and #3.

The first characteristic of the present embodiment may include a neighboring cell information acquisition unit 13 configured to acquire all pieces of the cell information respectively contained in the multiple downlink signals #1 and #3 which are determined by the cell identification determination unit 12 as different downlink signals transmitted from the different cells #1 and #3 and acquire one piece of cell information from the multiple downlink signals #2-1 and #2-2 which are determined by the cell identification determination unit 12 as the identical downlink signal transmitted from the identical cell #2.

The first characteristic of the present embodiment may also include a self parameter setting unit 14 configured so that an operational parameter is automatically set based on cell information acquired by the neighboring cell information acquisition unit 13.

As for a second embodiment of the present invention, the difference lies only on that the configuration of the radio base station BTS according to the first embodiment is included in a mobile station UE, and thus the description thereof is omitted.

Note that operations of the above-described radio base station BTS and mobile station UE may be implemented by hardware or may be implemented by a software module to be executed by a processor, or may be implemented in combination of the both.

The invention claimed is:

1. A radio base station used in a mobile communication system where the radio base station receives multiple downlink signals transmitted with an identical scrambling code from multiple cells geographically apart from each other, comprising:
   a receiver configured to receive the downlink signals from the cells through a plurality of paths; and
   circuitry configured to determine the downlink signals with the identical scrambling code as a same downlink signal transmitted from an identical cell based on determining that an arrival time difference between the downlink signals with the identical scrambling code is equal to or smaller than a predetermined value, and to determine the downlink signals with the identical scrambling code as downlink signals transmitted from different cells based on determining that the arrival time difference between the downlink signals with the identical scrambling code is larger than the predetermined value.

2. The radio base station according to claim 1, the circuitry being further configured to acquire all pieces of cell information respectively contained in a plurality of downlink signals determined by the circuitry as different downlink signals transmitted from different cells and to acquire only one of pieces of cell information respectively contained in the plurality of downlink signals determined by the circuitry as the identical downlink signal transmitted from the identical cell.

3. The radio base station according to claim 1, wherein the downlink signals with the identical scrambling code, transmitted from the identical cell, undergo a RAKE-combining process at the radio base station.

4. The radio base station according to claim 2, the circuitry being further configured to automatically set an operational parameter based on the cell information acquired by the circuitry.

5. The radio base station according to claim 2, wherein the downlink signals with the identical scrambling code, transmitted from the identical cell, undergo a RAKE-combining process at the radio base station.

6. The radio base station according to claim 4, wherein the downlink signals with the identical scrambling code, transmitted from the identical cell, undergo a RAKE-combining process at the radio base station.

7. A mobile station used in a mobile communication system where the mobile station receives multiple downlink signals transmitted with an identical scrambling code from multiple cells geographically apart from each other, comprising:
   a receiver configured to receive the downlink signals from the cells through a plurality of paths; and
   circuitry configured to determine the downlink signals with the identical scrambling code as a same downlink signal transmitted from an identical cell based on determining that an arrival time difference between the downlink signals with the identical scrambling code is equal to or smaller than a predetermined value, and to determine the downlink signals with the identical scrambling code as downlink signals transmitted from different cells based on determining that the arrival time difference between the downlink signals with the identical scrambling code is larger than the predetermined value.

8. The mobile station according to claim 7, the circuitry being further configured to acquire all pieces of cell information respectively contained in a plurality of downlink signals determined by the circuitry as different downlink signals transmitted from different cells and to acquire only one of pieces of cell information contained in the plurality of downlink signals determined by the circuitry as the identical downlink signal transmitted from the identical cell.

9. The mobile station according to claim 7, wherein the downlink signals with the identical scrambling code, transmitted from the identical cell, undergo a RAKE-combining process at the mobile station.

10. The mobile station according to claim 8, the circuitry being further configured to automatically set an operational parameter based on the cell information acquired by the circuitry.

11. The mobile station according to claim 8, wherein the downlink signals with the identical scrambling code, transmitted from the identical cell, undergo a RAKE-combining process at the mobile station.

12. The mobile station according to claim 10, wherein the downlink signals with the identical scrambling code, transmitted from the identical cell, undergo a RAKE-combining process at the mobile station.

13. A method, implemented by a communication apparatus used in a mobile communication system where the communication apparatus receives multiple downlink signals transmitted with an identical scrambling code from multiple cells geographically apart from each other, comprising:

receiving, by a receiver of the communication apparatus, the downlink signals from the cells through a plurality of paths; and     determining, by circuitry, the downlink signals with the identical scrambling code as a same downlink signal transmitted from an identical cell based on determining that an arrival time difference between the downlink signals with the identical scrambling code is equal to or smaller than a predetermined value, and     determining, by circuitry, the downlink signals with the identical scrambling code as downlink signals transmitted from different cells based on determining that the arrival time difference between the downlink signals with the identical scrambling code is larger than the predetermined value.

14. The method according to claim 13, wherein the downlink signals with the identical scrambling code, transmitted from the identical cell, undergo a RAKE-combining process at the communication apparatus.

\* \* \* \* \*